United States Patent Office 2,694,736
Patented Nov. 16, 1954

2,694,736
PRODUCTION OF ARYL ETHERS

Heinrich Pasedach, Ludwigshafen (Rhine), Germany, assignor to Badische Anilin- & Soda-Fabrik Aktiengesellschaft, Ludwigshafen (Rhine), Germany No Drawing. Application January 2, 1952, Serial No. 264,675

Claims priority, application Germany January 5, 1951

4 Claims. (Cl. 260—613)

This invention relates to a process for the production of new and valuable aryl ethers, especially of 4-aryl ethers of 1,2,4-butanetriols.

I have found that valuable aryl ethers are obtained by reacting butine(2)-diols(1,4) with aromatic hydroxy compounds in the presence of acid-reacting mercury compounds, separating the mercury, neutralizing and then hydrogenating catalytically the 4-aryloxy-butanol-(1)-ones-(2) formed.

Suitable butine(2)-diols(1,4) are, for instance, the unsubstituted butine(2)-diol(1,4) and its alkyl, cycloalkyl, aryl and aralkyl derivatives such as the pentine-(2)-diol(1,4), the hexine(3)-diol(2,5), the 1-phenyl-, 1-benzyl- or 1-cyclohexyl-butine(2)-diol(1,4).

Among suitable aromatic hydroxy compounds there may be mentioned for example phenol, the cresols, xylenols, naphthols and their alkoxy, halogeno, nitro and amino derivatives and the corresponding sulfonic and carboxylic acids, and also hydroquinone, resorcinol, pyrogallol or dihydroxydiphenyls, diphenyl ethers, sulfids or sulfones, such as p.p'-dihydroxydiphenyl; the polyhydric hydroxy compounds may be reacted one or more times with the butine-diol.

In the case of the unsubstituted butine(2)-diol(1,4), the reaction proceeds according to the scheme:

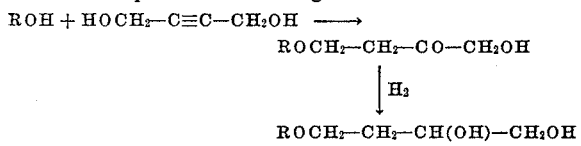

ROH representing an aromatic hydroxy compound.

The reaction of the butine-diol with the aromatic hydroxy compound is preferably carried out by mixing the reaction components together and then introducing the mercury compound serving as catalyst, as for example mercuric sulfate or a mixture of mercuric oxide and sulfuric acid or boron fluoride hydrate or phenolate at room or moderately elevated temperature while stirring vigorously. About 5 to 10% of mercuric oxide, calculated with reference to the butine-diol, and preferably as much acid as is necessary for the conversion of the mercuric oxide into its salt are employed. It is advantageous to work with the addition of a diluent, for which purpose an excess of the aromatic hydroxy compound may preferably serve. The reaction usually proceeds even in this case so vigorously that the reaction mixture must be cooled.

When the reaction is completed the mixture is freed in known manner from the catalysts and if necessary from the diluent.

For the preparation of the 4-aryloxybutane-diols-(1,2) it is usually sufficient to add a hydrogenation catalyst, as for example Raney-nickel, cobalt or copper, to the crude-reaction mixture freed from mercury and acid, to treat with hydrogen under a pressure of about 10 to 250 atmospheres at temperatures between about 40° and 150° C. and then to distil off the diluent after filtering off the catalyst.

The 4-monoaryl ethers of the 1,2,4-trihydroxybutanes thus obtainable in a simple manner in almost quantitative yields are oils of high boiling point or solid substances which are suitable as intermediate products for lacquers, resins, softening agents and pharmaceutical products.

The following examples will further illustrate this invention but the invention is not limited to the examples. The parts are by weight.

Example 1

30 parts of mercuric sulfate are gradually added, while stirring well, to a mixture of 400 parts of butine-(2)-diol-(1,4) and 3000 parts of o-cresol, care being taken by cooling that the temperature of the mixture does not rise above 20° to 30° C. The mercuric sulfate rapidly goes into solution. When, after several hours, the carbonyl number no longer increases, the mixture is heated for a few hours at 40° to 50° C. in order to separate the mercury completely as metal. The sulfuric acid is then neutralized by the addition of calcium carbonate, a little activated carbon is added and the whole filtered.

Without isolating the 4-(o-cresoxy)-butanol-(1)-one-(2), 150 parts of Raney-nickel are added to the filtrate which is then treated with hydrogen under a pressure of 200 atmospheres in an autoclave at 80° C. As soon as the absorption of hydrogen ends, the catalyst is filtered off and the excess o-cresol distilled off at reduced pressure. The residue for the most part passes over at 210° to 220° C. at 3 millimeters of mercury pressure, 720 parts of 4-(o-cresoxy)-butane-diol-(1,2) are thus obtained as a viscous oil. If, instead of o-cresol, equivalent amounts of phenol, of xylenols, of mono- and poly-chlorophenols or of 2-naphthol are used, there are obtained similar aryl ethers.

Example 2

To a mixture of 220 parts of resorcinol, 344 parts of butine(2)-diol(1,4) and 1000 parts of tetrahydrofurane are added gradually, while stirring well, 20 parts of mercuric sulfate, care being taken that the temperature of the mixture does not rise above 30° C. When the carbonyl number of the mixture no longer increases, it is heated for a few hours at 40° C. in order to separate the mercury as metal. The mixture is then neutralized by the addition of calcium carbonate, carbon is added and the whole filtered.

After addition of 40 parts of Raney-nickel the filtrate is treated with hydrogen of a pressure of about 200 atmospheres at 60° C. until no more hydrogen is used up. The catalyst is then filtered off and the tetrahydrofurane and the excess butane-diol(1,4) are distilled off. There remain 450 parts of a viscous oil consisting mainly of a resorcinol-bis-(1,2,4-butanetriol)ether of the formula

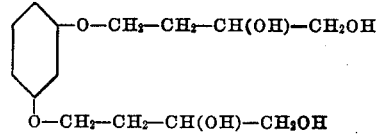

If, instead of butine(2)-diol(1,4), equivalent amounts of pentine(2)-diol(1,4) or hexine(3)-diol(2,5) are used, similar products are obtained.

What I claim is:

1. A process for the production of 4-aryl ethers of 1,2,4-butanetriol which comprises gradually adding to a mixture of butine-(2)-diol-(1,4) and an aromatic hydroxy compound selected from the group consisting of phenol, o-cresol and resorcinol at temperatures not exceeding 30° C. such amounts of mercuric sulfate which correspond to about 5 to 10 per cent of mercuric oxide, calculated to the amount of the butine-(2)-diol-(1,4) employed, stirring the mixture until the carbonyl number no longer increases, then heating to about 50° C. until the mercury has separated as metal, neutralizing the remaining mixture and hydrogenating the 4-aryloxy-butanol-(1)-one-(2) formed in the presence of a catalyst selected from the group consisting of Raney nickel, cobalt and copper with hydrogen at a pressure of about 40 to 250 atmospheres at temperatures between about 40 and 150° C.

2. A process for the production of 4-phenoxy-butane-diol-(1,2) which comprises gradually adding to a mixture of butine-(2)-diol-(1,4) and excess phenol at temperatures not exceeding 30° C. such amounts of mercuric sulfate which correspond to about 5 to 10 per cent of mercuric oxide, calculated to the amount of the butine-(2)-diol-(1,4) employed, stirring the mixture until the carbonyl number no longer increases, then heating to about 50° C. until the mercury has separated as metal, neutralizing the remaining mixture and hydrogenating the 4-phenoxybutanol-(1)-one-(2) formed in the presence of Raney nickel with hydrogen of a pressure of about 200 atmospheres at about 80° C.

3. A process for the production of resorcinol-bis-(1,2,4-butanetriol) ether which comprises adding to a mixture of resorcinol, butine-(2)-diol-(1,4) and tetrahydrofurane at temperatures not exceeding 30° C. such amounts of mercuric sulfate which correspond to about 5 to 10 per cent of mercuric oxide, calculated to the amount of the butine-(2)-diol-(1,4) employed, stirring the mixture until the carbonyl number no longer increases, then heating to about 50° C. until the mercury has separated as metal, neutralizing the remaining mixture and hydrogenating it in the presence of Raney nickel with hydrogen at a pressure of about 200 atmospheres at about 60° C.

4. A process for the production of 4-(o-cresoxy)-butanediol(1,2) which consists in reacting an excess of o-cresol with butine(2)-diol(1,4) in the presence of mercuric sulfate at temperatures up to 50° C., separating the mercury, neutralizing, and then hydrogenating the 4-(o-cresoxy)-butanol(1)-one(2) formed in the presence of Raney-nickel with hydrogen of a pressure of about 200 atmospheres at temperatures up to 120° C.

References Cited in the file of this patent

UNITED STATES PATENTS

| Number | Name | Date |
|---|---|---|
| 2,166,518 | Caplan | July 18, 1939 |

FOREIGN PATENTS

| Number | Country | Date |
|---|---|---|
| 849,807 | France | Dec. 2, 1939 |
| 449,639 | Belgium | Mar. 13, 1943 |
| 616,309 | Great Britain | Jan. 19, 1949 |
| 616,853 | Great Britain | Jan. 27, 1949 |
| 628,497 | Great Britain | Aug. 30, 1949 |
| 863,497 | Germany | Jan. 19, 1953 |

OTHER REFERENCES

Nazarov et al., Izvest. Akad. Navk. SSSR Otdel. Khim. Nauk. (1949), pp. 287–292. (Abstracted in Chem. Abstracts, vol. 43, p. 6624 (1949).)